(12) United States Patent
Sun et al.

(10) Patent No.: US 9,489,261 B2
(45) Date of Patent: *Nov. 8, 2016

(54) BACKGROUND INITIALIZATION FOR PROTECTION INFORMATION ENABLED STORAGE VOLUMES

(71) Applicant: NetApp, Inc., Sunnyvale, CA (US)

(72) Inventors: Wei Sun, Boulder, CO (US); Donald Humlicek, Wichita, KS (US); Theresa Segura, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,496

(22) Filed: Dec. 14, 2015

(65) Prior Publication Data

US 2016/0098322 A1    Apr. 7, 2016

Related U.S. Application Data

(63) Continuation of application No. 13/956,013, filed on Jul. 31, 2013, now Pat. No. 9,235,471.

(60) Provisional application No. 61/817,166, filed on Apr. 29, 2013.

(51) Int. Cl.
*G06F 12/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01); *G06F 11/108* (2013.01); *G06F 2211/1057* (2013.01); *G06F 2211/1059* (2013.01)

(58) Field of Classification Search
CPC ............. G06F 11/1076; G06F 11/108; G06F 2211/1057; G06F 2211/1059; G06F 3/0619; G06F 3/064; G06F 3/0689
See application file for complete search history.

(56) References Cited

U.S. PATENT DOCUMENTS

| 2004/0215877 | A1 | 10/2004 | Chatterjee et al. |
|---|---|---|---|
| 2004/0221102 | A1 | 11/2004 | Watanabe |
| 2008/0002820 | A1 | 1/2008 | Shtiegman et al. |
| 2008/0005146 | A1 | 1/2008 | Kubo et al. |
| 2008/0051146 | A1 | 2/2008 | Aslanian |
| 2008/0282030 | A1 | 11/2008 | Kalwitz et al. |
| 2011/0066770 | A1 | 3/2011 | Muppirala et al. |

OTHER PUBLICATIONS

International Search Report for Application No. PCT/US2014/035526 mailed on Aug. 27, 2014, 3 pages.
Written Opinion for Application No. PCT/US2014/035526 mailed on Aug. 27, 2014, 6 pages.

*Primary Examiner* — Yong Choe
(74) *Attorney, Agent, or Firm* — Haynes and Boone, LLP (57) ABSTRACT

Technology is disclosed for performing background initialization on protection information enabled storage volumes or drives. In some embodiments, a storage controller generates multiple I/O requests for stripe segments of each drive (e.g., disk) of multiple drives of a RAID-based system (e.g., RAID-based disk array). The I/O requests are then sorted for each of the drives according to a pre-determined arrangement and initiated in parallel to the disks while enforcing the pre-determined arrangement. Sorting and issuing the I/O requests in the manner described herein can, for example, reduce drive head movement resulting in faster storage subsystem initialization.

20 Claims, 9 Drawing Sheets

BACKGROUND INITIALIZATION FOR PROTECTION INFORMATION ENABLED STORAGE VOLUMES

CLAIM OF PRIORITY

This application claims the benefit of U.S. Non-Provisional application Ser. No. 13/956,013, filed Jul. 31, 2013, entitled "Background Initialization For Protection Information Enabled Storage Volumes," and U.S. Provisional Patent Application No. 61/817,166 entitled "Background Initialization For Protection Information Enabled Storage Volumes," which was filed on Apr. 29, 2013, the contents of which are expressly incorporated by reference herein.

FIELD OF THE INVENTION

At least one embodiment of the disclosed technology pertains to data storage systems, and more particularly to, systems and methods for performing background initialization on Protection Information (PI) enabled storage volumes.

BACKGROUND

A network storage controller is a processing system that is used to store and retrieve data on behalf of one or more hosts on a network. A storage controller operates on behalf of one or more hosts to store and manage data in a set of mass storage devices, e.g., magnetic or optical storage-based disks, solid-state drives, or tapes. Some storage controllers are designed to service file-level requests from hosts, as is commonly the case with file servers used in network attached storage (NAS) environments. Other storage controllers are designed to service block-level requests from hosts, as with storage controllers used in a storage area network (SAN) environment.

Still other storage controllers are capable of servicing both file-level requests and block-level requests, as is the case with various storage controllers made by NetApp, Inc. of Sunnyvale, Calif.

A function commonly employed by storage controllers is the initialization of the storage subsystem. In some implementations, storage controllers can make some or all of the storage space on the drive(s) of a storage subsystem available to client systems once the drives are properly initialized. For example, each of the drive scan be implemented as an individual drive, multiple drives (e.g., a RAID group) or mass storage device(s). Storage of information in a mass storage subsystems can be implemented as one or more storage volumes that comprise a collection of physical storage drives (e.g., disks) cooperating to define an overall logical arrangement of volume block number (VBN) space on the volume(s). Each logical volume is generally, although not necessarily, associated with its own file system.

The drives within a logical volume/file system can be organized as one or more groups, wherein each group may be operated as a Redundant Array of Independent (or Inexpensive) Drives (RAID). Most RAID implementations, e.g., a RAID-6 level implementation, enhance the reliability/integrity of data storage through the redundant writing of data "stripes" across a given number of physical drives in the RAID group, and the appropriate storing of parity information with respect to the striped data. However, the RAID volumes must be initialized, for example, using an Immediate Available Format (IAF) background initialization process. The IAF background initialization process ensures consistent parity across the RAID volumes prior to (or simultaneously with) use (e.g., reads or writes) by the client systems by reading data in the uninitialized regions (e.g., the striped data), calculating the parity information, and storing the calculated parity information on the appropriate physical disks in the RAID group.

With the introduction of Protection Information (PI) enabled RAID volumes, the IAF process must ensure that all of the blocks on the physical drives contain the correct PI. The PI information typically includes a reference tag field that indicates logical blocks addresses which, in some configurations (e.g., RAID volumes with type-1 protection), are not contiguous between stripe segments on a drive. In these configurations, the IAF background initialization procedure is limited to an Input/Output "I/O" size of a single stripe segment as the PI is inserted sequentially in the drive channel. Consequently, the introduction of PI-enabled RAID volumes prevents the background initialization procedure from reading and/or writing large chunks of data to insert and/or verify the protection information.

Unfortunately, because the IAF procedure is limited to an I/O size of a single stripe segment, the IAF background initialization procedure can take on the order of multiple months or longer to initialize large storage systems. This problem can be due to excessive drive head movement at a disk array of the storage subsystem. Furthermore, during the background initialization process, performance of host I/O to initialized regions is seriously degraded.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As discussed above, logical blocks can be non-contiguous between stripe segments on individual drives of RAID-based systems. Furthermore, the initialization I/O conventionally can request a single stripe segment per request because some protection information cannot be inserted by an I/O control chip within a drive channel if the read requests are for multiple stripe segments. In conventional storage systems, the relatively small I/O can become intermingled with other initialization I/O requests and/or host I/O (e.g., client I/O). This intermingling of I/O slows down the initialization process considerably. Consequently, by sorting and/or otherwise ordering the initialization I/O requests according to a pre-determined arrangement and issuing the initialization I/O requests in parallel to appropriate drives, initialization time can be improved.

I. Overview

A. System Architecture

Figure 1:
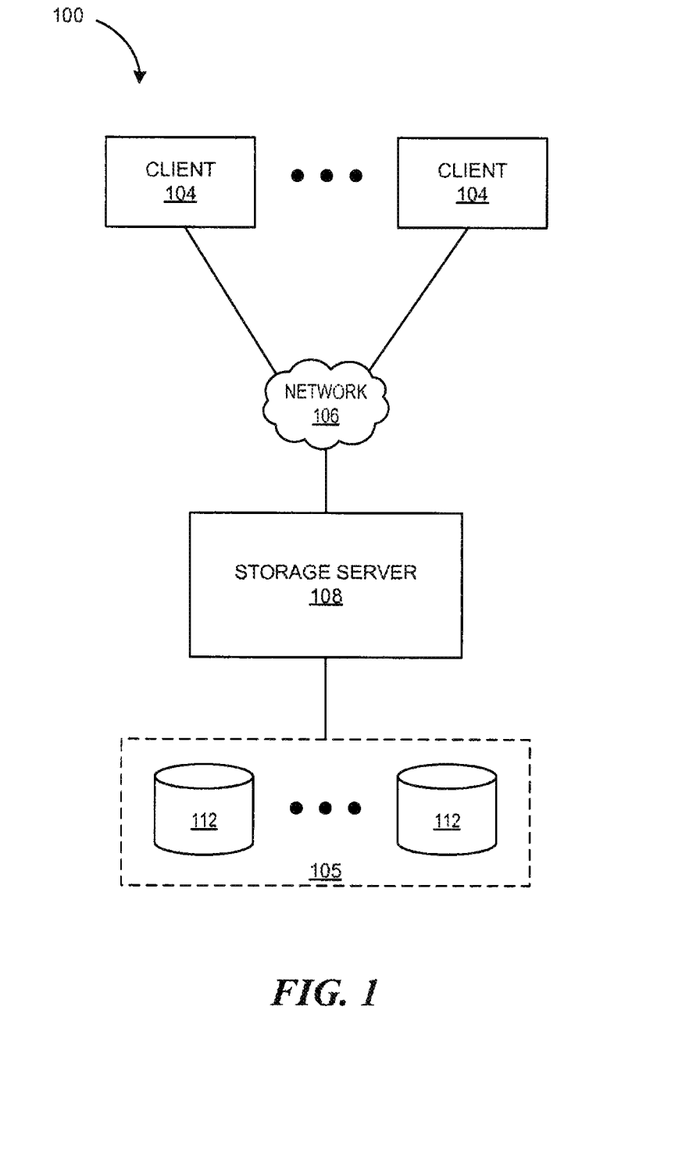
FIG. 1 is a block diagram illustrating an example of a network storage system.

FIG. 1 is a block diagram illustrating an example network storage system 100 (or configuration) in which the techniques introduced herein can be implemented. The network configuration described with respect to FIG. 1 is for illustration of a type of configuration in which the techniques can be implemented; other network storage configurations and/or schemes could be used for implementing the techniques introduced herein.

As illustrated in the example of FIG. 1, the network storage system 100 includes multiple client systems 104, a storage server 108, and a network 106 connecting the client systems 104 and the storage server 108. The storage server 108 is coupled with a number of mass storage devices (or storage containers) 112, e.g., disks, in a mass storage subsystem 105. Alternatively or additionally, some or all of the mass storage devices 112 can be other types of storage, e.g., flash memory, solid-state drives (SSDs), tape storage, etc. However, for ease of description, the storage devices 112 are assumed to be disks herein.

Although illustrated as distributed systems, in one embodiment the storage server 108 and the mass storage subsystem 105 can be physically contained and/or otherwise located in the same enclosure. For example, the storage system 108 and the mass storage subsystem 105 can together be one of the E-series storage system products available from NetApp®, Inc. The E-series storage system products can include one or more embedded controllers (or storage servers) and disks. Furthermore, the storage system can, in some embodiments, include a redundant pair of controllers that can be located within the same physical enclosure with the disks. The storage system can be connected to other storage systems and/or to disks within or without the enclosure via a serial attached SCSI (SAS)/Fibre Channel (FC) protocol. Other protocols for communication are also possible including combinations and/or variations thereof are to other storage systems (or enclosure) with one or more controller and more disks and/or a storage system (or enclosure) with only disks.

In another embodiment, the storage server 108 can be, for example, one of the FAS-series of storage server products available from NetApp®, Inc. The client systems 104 can be connected to the storage server 108 via the network 106, which can be a packet-switched network, for example, a local area network (LAN) or wide area network (WAN). Further, the storage server 108 can be connected to the disks 112 via a switching fabric (not illustrated), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s) including combinations and/or variations thereof. Storage of information in the mass storage subsystem 105 can be implemented as one or more storage volumes that comprise a collection of physical storage disks 112 cooperating to define an overall logical arrangement of volume block number (VBN) space on the volume(s). Each logical volume is generally, although not necessarily, associated with its own file system.

The disks within a logical volume/file system are typically organized as one or more groups, wherein each group may be operated as a Redundant Array of Independent (or Inexpensive) Disks (RAID). Most RAID implementations, e.g., a RAID-6 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-6 level implementation, although it should be understood that other types and levels of RAID implementations may be used according to the techniques described herein. One or more RAID groups together form an aggregate. An aggregate can contain one or more volumes.

The storage server 108 can receive and respond to various read and write requests from the client systems 104, directed to data stored in or to be stored in the storage subsystem 105.

Although the storage server 108 is illustrated as a single unit in FIG. 1, it can have a distributed architecture. For example, the storage server 108 can be designed as a physically separate network module (e.g., "N-blade") and disk module (e.g., "D-blade) (not illustrated), which communicate with each other over a physical interconnect. Such an architecture allows convenient scaling, e.g., by deploying two or more N-blades and D-blades, all capable of communicating with each other through the physical interconnect.

A storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual servers, (e.g., to avoid interference) are able to run on the same physical server because of the functional isolation provided by a virtual storage server implementation. This can be a more cost effective way of providing storage server solutions to multiple customers than providing separate physical servers for each customer.

Figure 2:
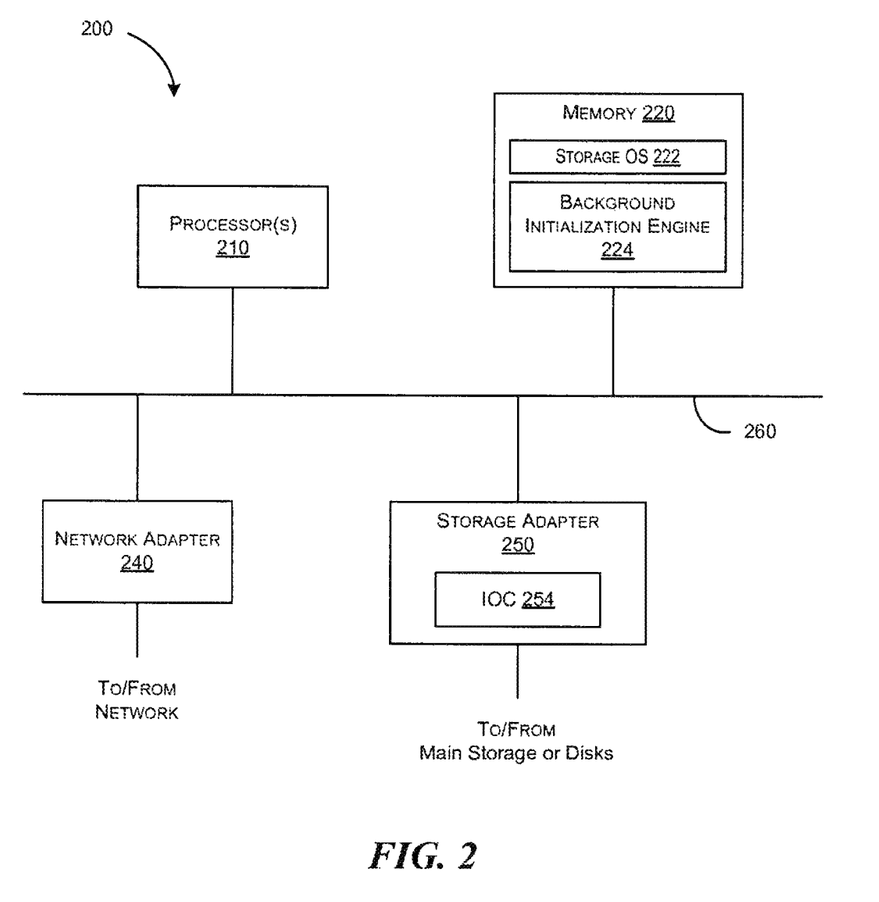
FIG. 2 is a diagram illustrating an example of a storage controller that can implement one or more network storage servers.

FIG. 2 is a diagram illustrating an example of the hardware architecture of a storage controller 200 that can implement one or more network storage servers, for example, storage server 108 of FIG. 1. The storage server is a processing system that provides storage services relating to the organization of information on storage devices, e.g., disks 112 of the mass storage subsystem 105. In an illustrative embodiment, the storage server 108 includes a processor subsystem 210 that includes one or more processors. The storage server 108 further includes a memory 220, a network adapter 240, and a storage adapter 250, all interconnected by an interconnect 260, e.g., a physical interconnect.

The storage server 108 can be embodied as a single- or multi-processor storage server executing a storage operating system 222 that preferably implements a high-level module, called a storage manager, to logically organize data as a hierarchical structure of named directories, files, and/or data "blocks" on the disks 112. A block can be a sequence of bytes of specified length.

The memory 220 illustratively comprises storage locations that are addressable by the processor(s) 210 and adapters 240 and 250 for storing software program code and data associated with the techniques introduced here. For example, some of the storage locations of memory 220 can be used to store a background initialization engine 224. The background initialization engine 224 performs and manages the background initialization procedures and/or techniques described herein.

The storage operating system 222, portions of which are typically resident in memory and executed by the processing elements, functionally organizes the storage server 108 by (among other functions) invoking storage operations in support of the storage service provided by the storage server 108. It will be apparent to those skilled in the art that other processing and memory implementations, including various other non-transitory media, e.g., computer readable storage media, may be used for storing and executing program instructions pertaining to the techniques introduced here. Similar to the storage server 108, the storage operating system 222 can be distributed, with modules of the storage system running on separate physical resources. In some embodiments, instructions or signals can be transmitted on transitory computer readable media, e.g., carrier waves.

The network adapter 240 includes multiple ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network or a Fibre Channel network. Each client 104 can communicate with the storage server 108 over the network 106 by exchanging packets or frames of data according to pre-defined protocols, e.g., Transmission Control Protocol/Internet Protocol (TCP/IP).

The storage adapter 250 cooperates with the storage operating system 222 to access information requested by clients 104. The information may be stored on any type of attached array of writable storage media, e.g., magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes multiple ports having input/output (I/O) interface circuitry that couples with the disks over an I/O interconnect arrangement, e.g., a conventional high-performance, Fibre Channel link topology. The storage adapter 250 can also include an I/O chip (IOC) 254. As described herein, the IOC 254 can insert and/or check Protection Information (PI) for PI-enabled storage volumes inside or within the drive channel.

The storage operating system 222 facilitates clients' access to data stored on the disks 112. In certain embodiments, the storage operating system 222 implements a write-anywhere file system that cooperates with one or more virtualization modules to "virtualize" the storage space provided by disks 112. In certain embodiments, a storage manager element of the storage operation system 222 such as, for example storage manager 310 of FIG. 3, logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical units.

The interconnect 260 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire," Fibre-Channel, Thunderbolt, and/or any other suitable form of physical connection including combinations and/or variations thereof.

Figure 3:
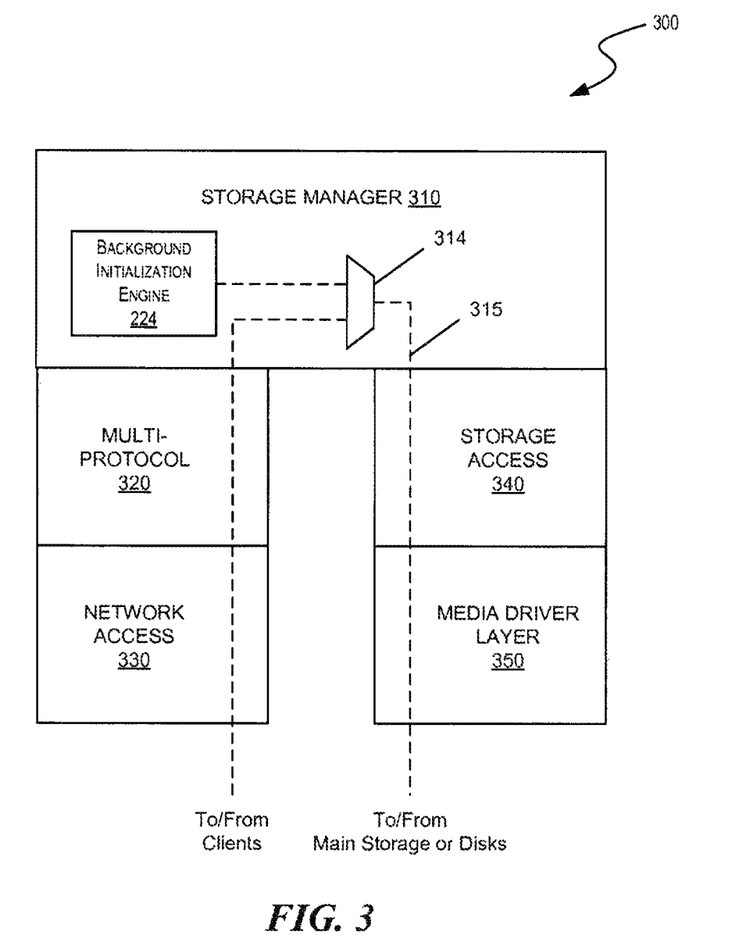
FIG. 3 schematically illustrates an example of the architecture of a storage operating system in a storage server.

FIG. 3 schematically illustrates an example of the architecture 300 of a storage operating system 222 for use in a storage server 108. In one embodiment, the storage operating system 222 can be the NetApp® Data ONTAP® operating system available from NetApp, Inc., Sunnyvale, Calif. that implements a Write Anywhere File Layout (WAFL®) file system. However, another storage operating system may alternatively be designed or enhanced for use in accordance with the techniques described herein.

The storage operating system 222 can be implemented as programmable circuitry programmed with software and/or firmware, or as specially designed non-programmable circuitry (i.e., hardware), or in a combination and/or variation thereof. In the illustrated embodiment, the storage operating system 222 includes several modules, or layers. These layers include a storage manager 310, which is a functional element of the storage operating system 222. The storage manager 310 imposes a structure (e.g., one or more file systems) on the data managed by the storage server 108 and services read and write requests from clients 104.

To allow the storage server to communicate over the network 106 (e.g., with clients 104), the storage operating system 222 can also include a multi-protocol layer 320 and a network access layer 330, logically under the storage manager 310. The multi-protocol layer 320 implements various higher-level network protocols, e.g., Network File System (NFS), Common Internet File System (CIFS), Hypertext Transfer Protocol (HTTP), and/or Internet small computer system interface (iSCSI), to make data stored on the disks 112 available to users and/or application programs. The network access layer 330 includes one or more network drivers that implement one or more lower-level protocols to communicate over the network, e.g., Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105 of FIG. 1), the storage operating system 222 includes a storage access layer 340 and an associated storage driver layer 350 logically under the storage manager 310. The storage access layer 340 implements a higher-level storage redundancy algorithm, e.g., RAID-4, RAID-5, RAID-6, or RAID DP®. The storage driver layer 350 implements a lower-level storage device access protocol, e.g., Fibre Channel Protocol or small computer system interface (SCSI).

Also illustrated in FIG. 3 is the path 315 of data flow through the storage operating system 222, associated with a read or write operation, from the client interface to the storage interface. A background initialization engine 324 e.g., for example, the background initialization engine 224 of FIG. 2 can control a multiplexor to initiate read or write operations for performing the background initialization procedures described herein initiating I/O operations to/from the main storage (e.g., storage subsystem 105 of FIG. 1). For example, as discussed above, IAF on a RAID volume makes parity consistent for the volumes. With the introduction of PI volumes, the IAF background initialization procedure also can insert PI information into each stripe segment. The background initialization engine 224 can control and/or otherwise maintain the initialization process by identifying chunks of data to be initialized on the main storage, generating multiple I/O operations (i.e., read and/or write operations) for each chunk of data, sorting the I/O operations according to a pre-determined arrangement for reducing drive head movement at the disk array, and issuing the I/O requests in parallel while enforcing the pre-determined arrangement of read requests.

After a portion of the main storage is initialized, the storage manager 310 accesses the storage subsystem 105 through the storage access layer 340 and the storage driver layer 350. Clients 104 can interact with the storage server 108 in accordance with a client/server model of information delivery (e.g., host I/O). That is, the client 104 requests the services of the storage server 108, and the storage server may return the results of the services requested by the client, by exchanging packets over the network 106. The clients may issue packets including file-based access protocols, e.g., CIFS or NFS, over TCP/IP when accessing information in the form of files and directories. Alternatively, the clients may issue packets including block-based access protocols, e.g., iSCSI and SCSI, when accessing information in the form of blocks.

B. File System Structure

It is useful now to consider how data can be structured and organized in a file system by storage controllers such as, for example, storage server 108 of FIG. 1, according to certain embodiments. The term "file system" is used herein only to facilitate description and does not imply that the stored data must be stored in the form of "files" in a traditional sense; that is, a "file system" as the term is used herein can store data in the form of blocks, logical units (LUNs) and/or any other type(s) of units.

In at least one embodiment, data is stored in volumes. A "volume" is a logical container of stored data associated with a collection of mass storage devices, e.g., disks, which obtains its storage from (e.g., is contained within) an aggregate, and which is managed as an independent administrative unit, e.g., a complete file system. Each volume can contain data in the form of one or more directories, subdirectories, qtrees, files and/or files. An "aggregate" is a pool of storage that combines one or more physical mass storage devices (e.g., disks) or parts thereof into a single logical storage object. An aggregate contains or provides storage for one or more other logical data sets at a higher level of abstraction, e.g., volumes.

II. Background Initialization

Figure 4:
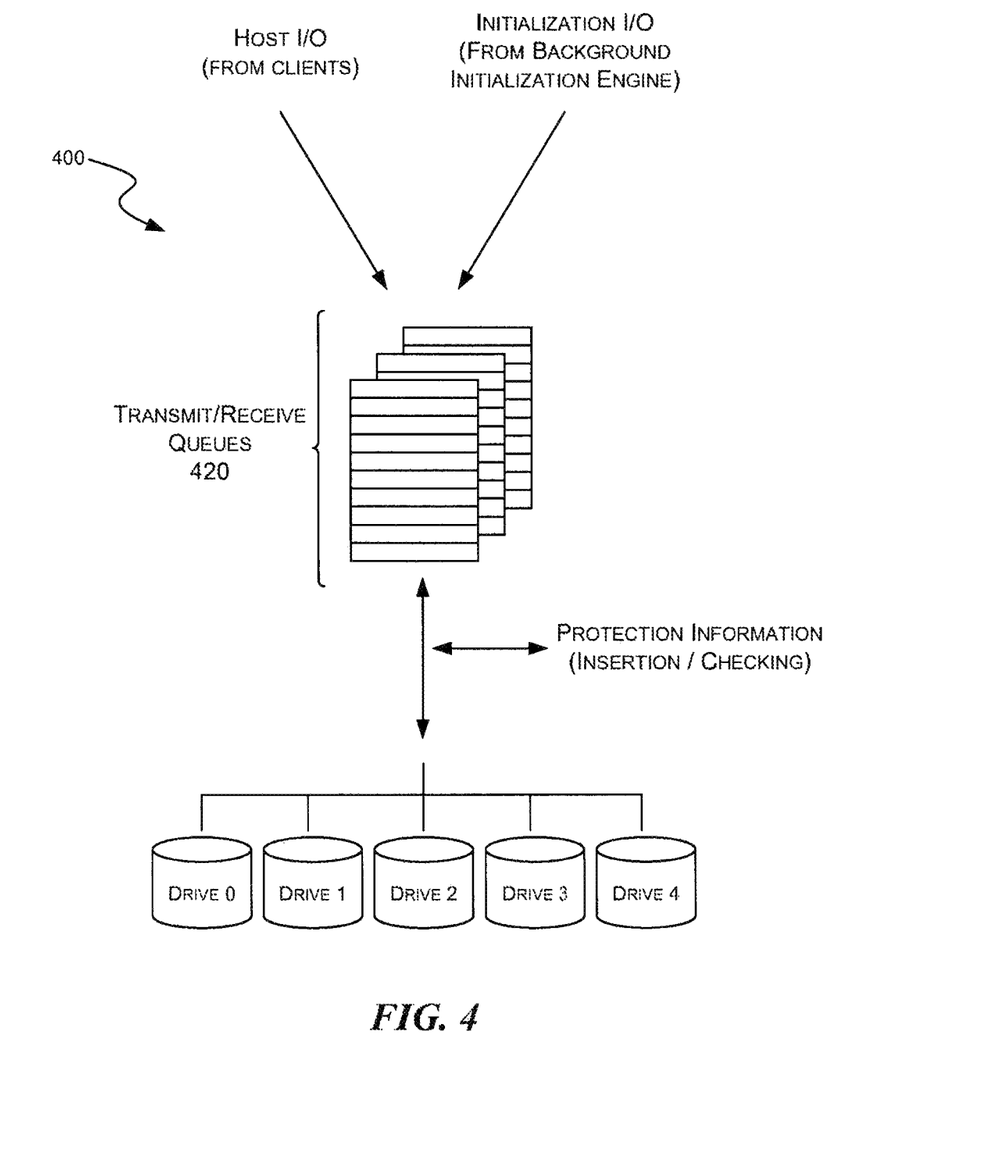
FIG. 4 illustrates an example scheme for performing background initialization for protection information enabled storage volumes.

FIG. 4 is an example diagram 400 illustrating operation of a background initialization procedure for inserting and/or checking protection information on RAID-based storage volumes (i.e., drives 0-4), according to an embodiment. More specifically, in the example of FIG. 4, a background initialization procedure is performed by a storage controller such as, for example, storage controller 200 of FIG. 2.

The storage controller 400 includes transmit/receive queues 420. The transmit/receive queues 420 receive host requests from client systems such as, for example, clients 104 of FIG. 1 and initialization I/O request from a background initialization engine such as, for example, background initialization engine 224 of FIG. 2. As discussed above, the background initialization engine 224 performs the background initialization procedure and maintains an indication of the storage that has been initialized (see, for example, FIG. 5 initialization boundary 526).

In some embodiments, the transmit/receive queues 420 act as first-in first-out (FIFO) queues. The background initialization engine 224 issues initialization I/O (i.e., read and/or write requests) in parallel to the transmit/receive queues so that the initialization I/O can be issued to the drives in parallel in a pre-determined arrangement or order that is determined by the background initialization engine. That is, the background initialization engine sorts the I/O requests in the pre-determined order to reduce drive head movement at the main storage. The background initialization engine subsequently issues the I/O requests in parallel to the transmit/receive queues 420 to preserve this arrangement or ordering.

Preservation of the ordering is important, at least in part, so that sequential protection information can be sequentially inserted (and/or checked) into each logical block of the read data within the drive channel. This insertion process is typically performed within the drive channel by an I/O chip such as, for example, IOC 254 of FIG. 2.

Figure 5:
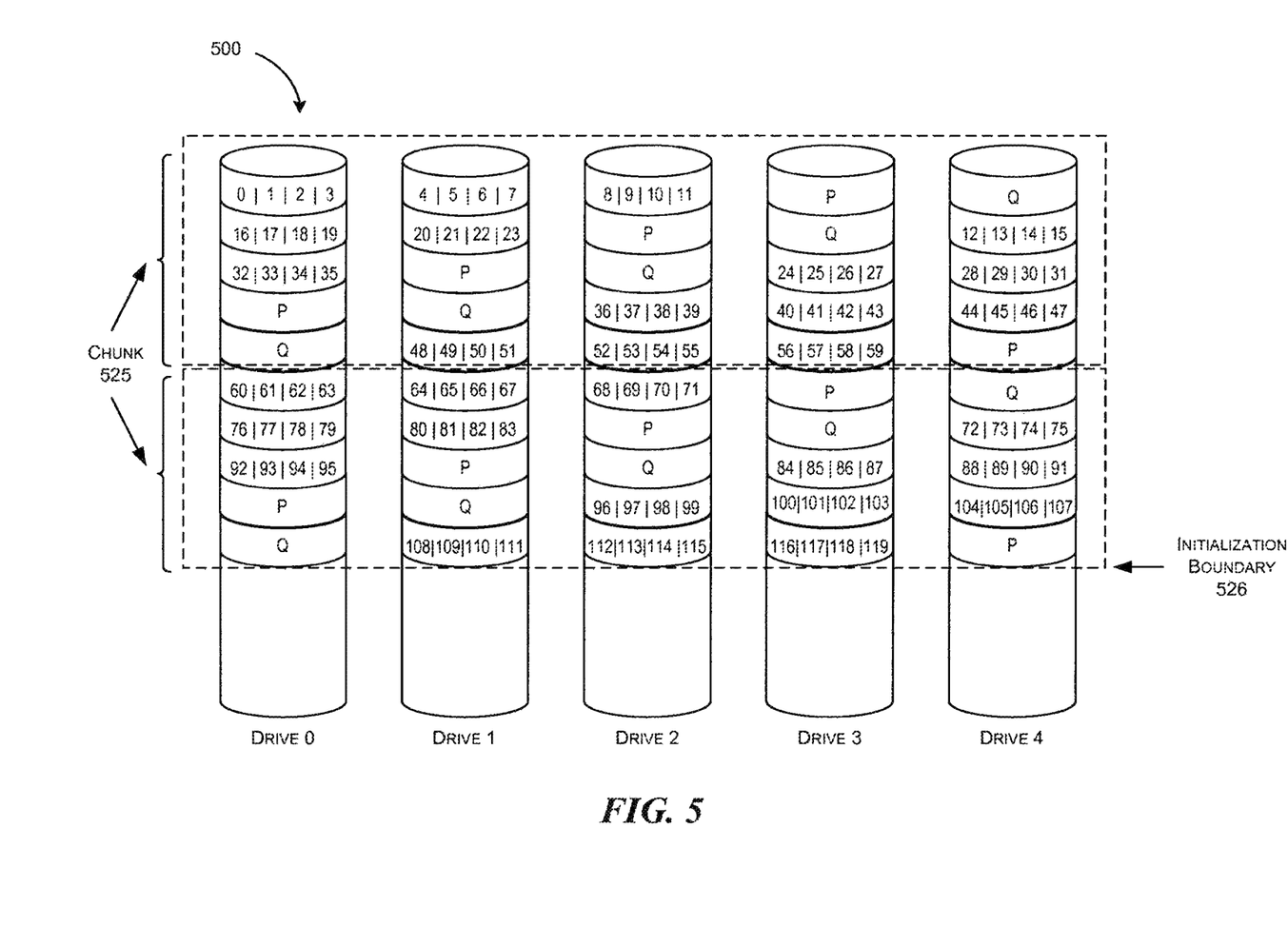
FIG. 5 illustrates example contents of various chunks of data on a protection information enabled RAID-based system.

FIG. 5 illustrates example contents of various drives of a storage subsystem 500. The storage subsystem 500 comprises a protection information enabled RAID-based system including the various drives.

The configuration illustrated with respect to FIG. 5 is a RAID-6 configuration. As is well known in the art, a RAID-6 configuration is particularly robust, providing for recovery of data stored on up to two drives of a group of five. That is, a RAID-6 configuration allows for the failure of up to two drives of a group of five. This reconstruction is made possible through the use of additional parity bits. For example, the calculation of P (or P "parity") can be determined from the XOR of each stripe. Likewise, the calculation of Q (or Q "parity") can be determined from a shifted version of each stripe or Galois Field Math (GFM).

In one embodiment, two different syndromes need to be computed in order to allow the loss of any two drives. A first ("P") syndrome can be simple XOR of the data across the stripes, as with RAID 5. A second ("Q") syndrome, independent of the ("P") syndrome, is typically more complex requiring the assistance of field theory.

To deal with this, the Galois field GF(m) is introduced with $m=2^k$, where $GF(m) \cong F_2[^x]/(p(^x))$ for a suitable irreducible polynomial $p(^x)$ of degree k. A chunk of data can be written as $d_{k-1}d_{k-2} \ldots d_0$ in base 2 where each $d_i$ is either 0 or 1. This is chosen to correspond with the element $d_{k-1}x^{k-1}+d_{k-2}x^{k-2}+\ldots+d_1x+d_0$ in the Galois Field. Let $D_0, \ldots, D_{n-1} \in GF(m)$ correspond to the stripes of data across hard drives encoded as field elements in this manner (in practice they would probably be broken into byte-sized chunks). If g is some generator of the field and $\oplus$ denotes addition in the field while concatenation denotes multiplication, then P and Q may be computed as follows (n denotes the number of data drives:

$$P = \bigoplus_i D_i = D_0 \oplus D_1 \oplus D_2 \oplus \ldots \oplus D_{n-1}$$

$$Q = \bigoplus_i g^i D_i = g^0 D_0 \oplus g^1 D_1 \oplus g^2 D_2 \oplus \ldots \oplus g^{n-1} D_{n-1}$$

In one embodiment, $\oplus$ can represent, for example, a bitwise XOR operator and $g^i$ can represent the action of a linear feedback shift register on a chunk of data. Thus, in the formula above, the calculation of P is just the XOR of each stripe. This is because addition in any characteristics two finite field reduces to the XOR operation. The computation is Q is the XOR of a shifted version of each stripe.

Mathematically, the generator is an element of the field such that $g^i$ is different for each nonnegative i satisfying i<n. If one data drive is lost, the data can be recomputed from P just like with RAID 5. If two data drives are lost or a data drive and the drive containing P are lost, the data can be recovered from P and Q or from just Q, respectively, using a more complex process. Working out the details is extremely hard with field theory. Suppose that $D_i$ and $D_j$ are the lost values with i≠j. Using the other values of $D_1$ constants A and B may be found so that $D_i \oplus D_j = A$ and $g^2 D_i \oplus g^j D_j = B$.

$$A = \bigoplus_{\ell: \ell \neq i \text{ and } \ell \neq j} D_\ell =$$

$$P \oplus D_0 \oplus D_1 \oplus \ldots \oplus D_{i-1} \oplus D_{i-1} \oplus \ldots \oplus D_{j-1} \oplus D_{j-1} \oplus \ldots D_{n-1}$$

$$B = \bigoplus_{\ell: \ell \neq i \text{ and } \ell \neq j} g^\ell D_\ell = Q \oplus g^0 D_0 \oplus g^1 D_1 \oplus \ldots \oplus g^{i-1} D_{i-1} \oplus$$

$$g^{i+1} D_{i+1} \oplus \ldots \oplus g^{j+1} D_{j+1} g^{j-1} D_{j-1} \oplus \ldots \oplus g^{j-1} D_{j-1} \oplus g^{n-1} D_{n-1}$$

Multiplying both sides of the equation for B by $g^{n-i}$ and adding to the former equation yields $(g^{n-i+j} \oplus 1)D_j = g^{n-i} B \oplus A$ and thus a solution for $D_j$, which may be used to compute $D_i$. Thus, the computation of Q can be more CPU intensive compared to the simplicity of P.

Although, the following discussion with respect to FIGS. 5-9 is primarily directed to examples describing RAID-6 configurations, it is appreciated that other RAID configurations are also possible and can benefit from the techniques described herein.

Referring first to FIG. 5, two chunks of data 525 are illustrated within the RAID-based system (i.e., storage subsystem 500). Two chunks are illustrated for simplicity of discussion, storage subsystem 500 can include any number of chunks 525. As illustrated in the example of FIG. 5, each chunk of data 525 comprises a group of five stripe segments on each of the drives (i.e., drives 0-4) or five stripes of data. Although illustrated as five stripe segments, a chunk can include any number of stripe segments. Furthermore, each stripe segment can include multiple logical blocks. As illustrated in the example of FIG. 5, each stripe segment includes four logical blocks; however, each stripe segment can include any number of logical blocks. The logical blocks are contiguous within the stripe segments and non-contiguous between the stripe segments. For example, as illustrated in the example of FIG. 5, the first stripe segment on drive 0 includes logical blocks 0, 1, 2, and 3, and the second stripe segment one drive 0 includes logical blocks 16, 17, 18, and 19. Thus, the logical blocks between the first stripe segment and the second stripe segment proceed from 3 to 16 (i.e., noncontiguous).

A storage controller 200 of FIG. 2 can provide storage capabilities to one or more client systems, e.g., client system 104 of FIG. 1, using the storage on the storage subsystem 500. The storage controller typically initializes the storage subsystem 500 prior to use by client systems. The initialization is performed in the background. That is, once a section (one or more chunks) is initialized, that section can be used for regular (normal or non-initialization) host I/O (e.g., client system I/O requests). In some embodiments, the storage controller maintains one or more initialization boundaries 526. The initialization boundaries 526 can indicate the initialized and/or the uninitialized sections of the storage subsystem 500.

Figure 6:
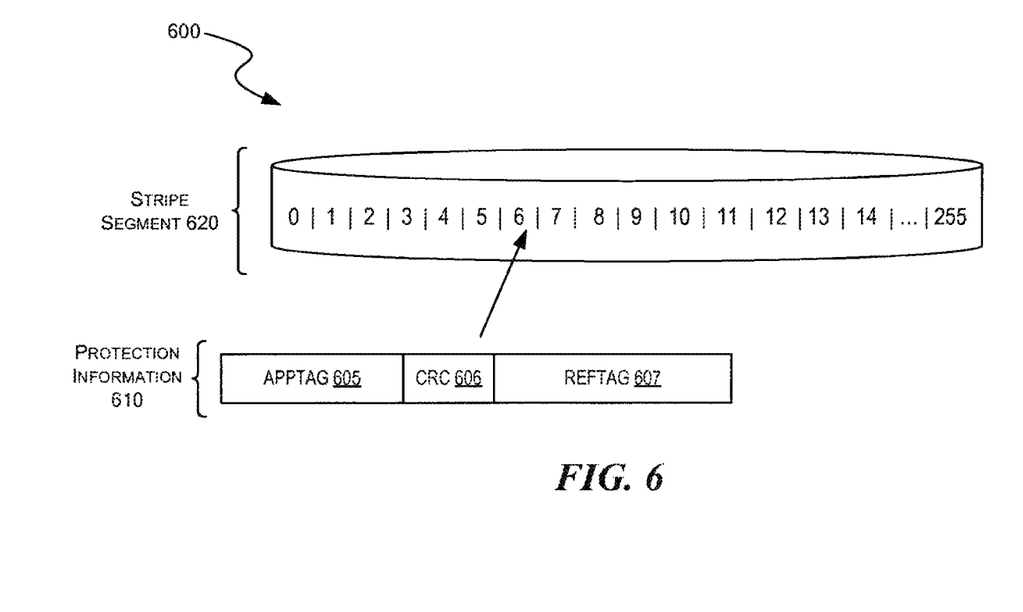
FIG. 6 illustrates an example technique for insertion of protection information.

FIG. 6 is an example diagram 600 illustrating insertion of protection information 610 into a stripe segment 620. In the example of FIG. 6, the stripe segment 620 includes 256 logical blocks. Although only logical block number 6 is illustrated having its protection information 610 inserted, it is appreciated that during initialization each logical block 0-255 has protection information inserted. Additionally, as described herein, the protection information is inserted within a drive channel by an IOC such as, for example, IOC 254 of FIG. 2.

The protection information 610 can include various fields including, but not limited to, an application tag 605, a cyclic redundancy check (CRC) 606, and a reference tag 607. The application tag (or "apptag") 605 can indicate the storage controller or application that owns the logical block. For example, the apptag can be a service set identifier (SSID). The cyclic redundancy check (or CRC) 606 can be computed based on data in the logic block. The reference tag (or reftag) 607 can indicate the host volume logical block address (LBA). The reference tag is inserted sequentially into the stripe segments. As discussed above, and illustrated in FIG. 5, logical blocks are non-contiguous between stripe segments on an individual drive. Consequently, the initialization I/O needs to be divided into stripe segments (i.e., initialization I/O can only be for a single strip segment) because reference tags 607 cannot be inserted by the IOC within the drive if the read requests are for multiple stripe segments.

In current systems, the relatively small I/O can easily get intermingled with other initialization I/O and host I/O (i.e., client I/O). This intermingling slows down the initialization process considerably. Consequently, by sorting the I/O requests according to a pre-determined arrangement and issuing the I/O requests in parallel to appropriate drives, initialization time can be improved by 70% or more across RAID-based systems.

Figure 7:
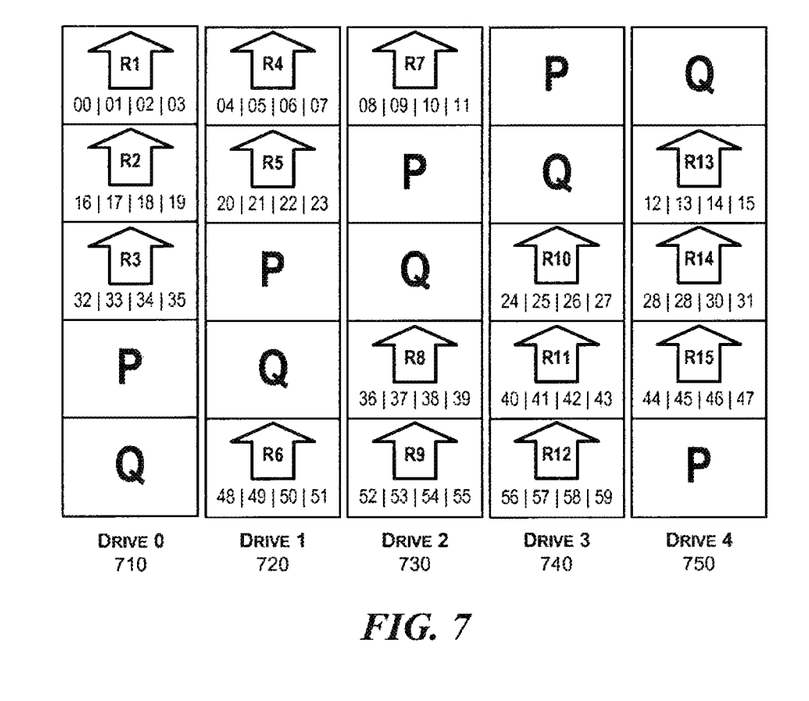
FIG. 7 illustrates an example initialization process including reading multiple stripe segments of data in parallel from a protection information enabled RAID-based system.

FIG. 7 is an example diagram 700 illustrating various reading steps of a background initialization process described herein, according to an embodiment. More specifically, the read aspects of a background initialization process for a sample RAID-6 volume with stripe segment size of four blocks is described. The numbers in each stripe segment represent the corresponding volume logical block address (LBA). In some embodiments, the number can also indicate the reference tag field for various storage controllers.

In the example of FIG. 7, a single chunk of data having five stripes is read by a storage controller. Each drive, e.g., Drive 0 710, Drive 1 720, Drive 2 730, Drive 3 740, and Drive 4 750, includes stripe segments and parity segments. As described herein, a read request must be generated by a storage controller for each stripe segment (i.e., each non-parity segment) of the chunk. The example of FIG. 7 illustrates generation of fifteen read requests that are issued from the storage controller in parallel to a protection information enabled RAID-based system. In one embodiment, the number of read requests (e.g., the chunk size) is chosen to match the max I/O size of the controller.

Each arrow on the figure represents a read request to the drive as part of the background initialization process. PI information is inserted during each read operation. Parity segments are skipped, as the parity segment data is generated from XOR (or GFM) later in the process. The read request to all drives are issued at or near the same time for parallel processing by the drives. The individual reads or threads for a drive are issued sequentially to each drive based on LBA. Accordingly, when issued, read requests R1, R2, and R3 appear as three sequential read requests (or I/O requests) to Drive 0 710. Likewise, read requests R4, R5, and R6 appear as three sequential read requests to Drive 1 720.

Figure 8:
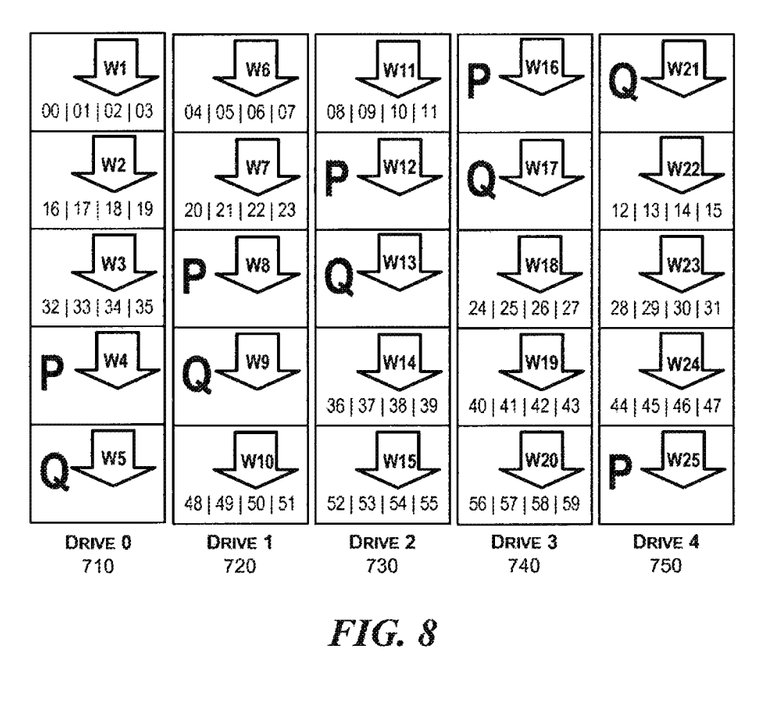
FIG. 8 illustrates an example initialization process including writing multiple stripe segments of data in parallel to a protection information enable RAID-based system.

FIG. 8 is an example diagram 800 illustrating various writing steps of a background initialization process described herein, according to an embodiment. More specifically, the initialization process includes writing to each drive, e.g., Drive 0 710, Drive 1 720, Drive 2 730, Drive 3 740, and Drive 4 750 of FIG. 7, multiple stripe segments of data in parallel to a protection information enable RAID-based disk array.

After parity generation, write requests are sorted and issued at or near the same time to the drives. Additionally, the individual writes to a drive (the threads) are issues is sequence (e.g., in the order of Drive LBA). P I information is checked on the segment during write within the drive channel(s). As an example, Write requests W1, W2, W3, W4 and W5 look like sequential request to the Drive 0. It is important that the requests are issued at the same time or in parallel to ensure that disk drives can process the request in parallel. Additionally, threads (i.e., individual I/O requests) are written sequentially. As discussed herein, issuing the requests to the disks sequentially prevents unnecessary drive head movement. Furthermore, issuing the I/O requests sequentially without intermingling host I/Os to different LBAs also prevents unnecessary drive head movement.

Figure 9:
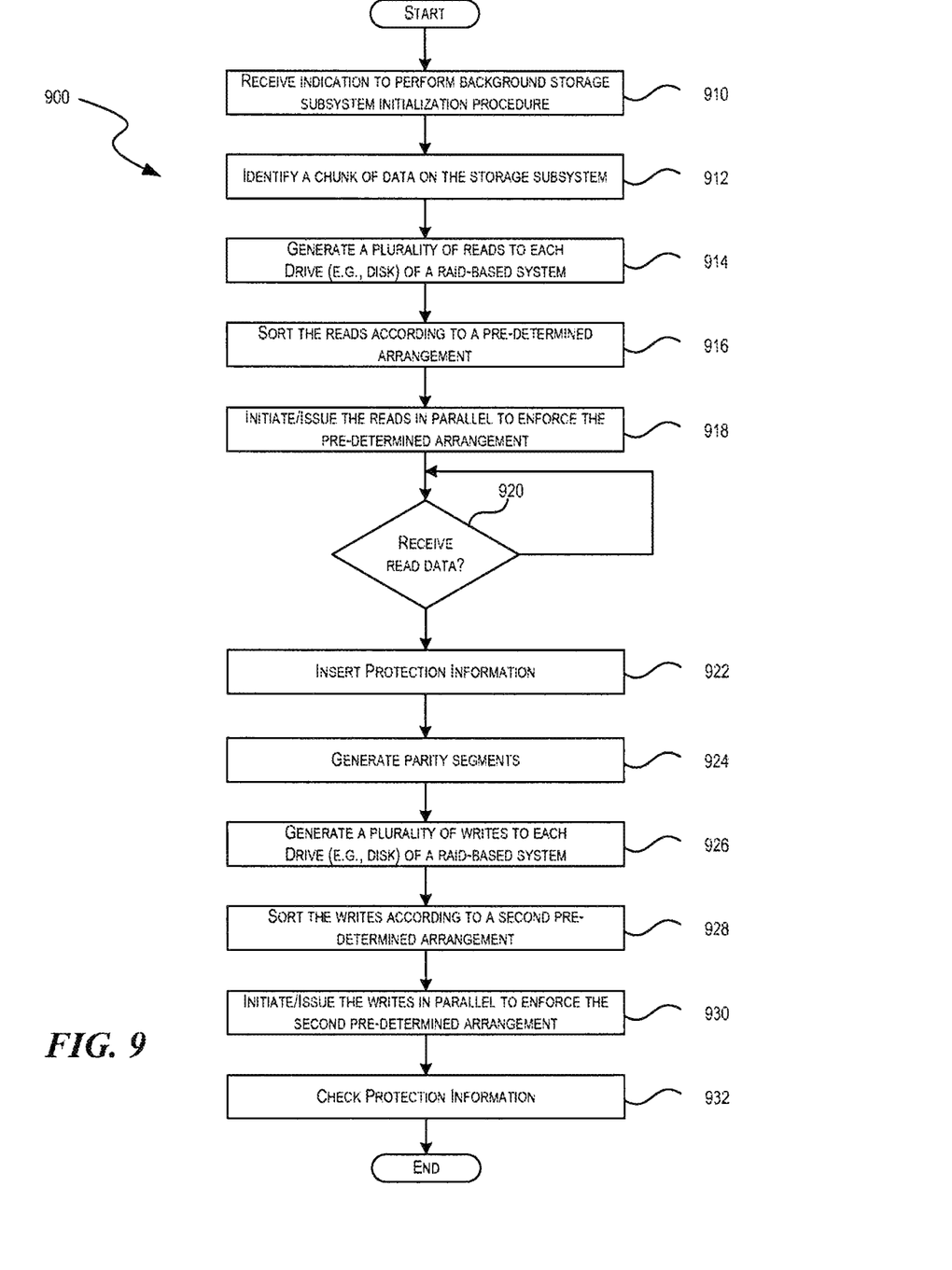
FIG. 9 illustrates an example background initialization process for a protection information enable RAID-based system.

FIG. 9 is a flow diagram illustrating an example background initialization procedure 900 for inserting and/or checking protection information on protection information enabled storage volumes of a RAID-based system, according to an embodiment. A storage controller e.g., storage controller 200 of FIG. 2, among other functions, performs the background initialization procedure. More specifically, a background initialization engine and an I/O chip e.g., background initialization engine 224 and an IOC 254 of FIG. 2 can, among other functions, perform the background initialization procedure. The background initialization engine and/or the I/O chip functionality may be embodied as hardware and/or software, including combinations and/or variation thereof. In addition, in some embodiments, the background initialization engine and/or the I/O chip include instructions, wherein the instructions, when executed by one or more processors of a storage controller, cause the storage controller to perform one or more steps including the following steps.

In a receive stage, at step 910, the storage controller receives an indication to perform a background storage subsystem initialization procedure. As discussed herein, the background initialization procedure ensures consistent parity across the RAID volumes prior to use (i.e., reads or writes) by the client systems. In some embodiments, rather than, or in addition to, receiving the indication to perform the background initialization procedure, the storage controller can also make the determine to perform the background storage subsystem initialization procedure.

In an identification stage, at step 912, the storage controller identifies a chunk of data of an uninitialized region on the storage subsystem to initialize. The chuck of data can be a pre-determined portion or quantity of data. For example, in some embodiments, the pre-determined portion may be set to the maximum I/O size. That is, although each initialization I/O request must be for a particular stripe segment, the pre-determined portion of data can be set to the maximum I/O size for the particular storage controller (e.g., 2 MB). Alternatively, the pre-determined portion may be set to a value lower or higher than the maximum I/O size for the particular storage controller.

In a read generation stage, at step 914, the storage controller generates multiple read requests to each drive (or disk) of the RAID-based system. For example, in some embodiments the storage controller generates a read request for each stripe segment on each drive of the chunk of data excluding the parity segments as the parity segments are not yet initialized.

In a read sorting stage, at step 916, the storage controller sorts the reads according to a pre-determined arrangement. The pre-determined arrangement may be defined to sort the read requests sequentially on a per drive (e.g., disk) basis in order to, for example, reduce the drive head movement on a disk array.

In a read initiation stage, at step 918, the storage controller initiates and/or otherwise issues the read requests in parallel to enforce the pre-determined arrangement. In one embodiment, the read requests may be initiated and/or otherwise issued to one or more transmit queue(s) in parallel. In this case, the transmit queue(s) enforce the order or arrangement of the requests to each of the drives of the RAID-based system.

In a decision stage, at step 920, the storage controller determines if it has received responses to the read request (i.e., the read data) from the storage subsystem. If the responses have not been received, the storage controller waits for the responses.

If the responses have been received, in an insertion stage, at step 922, the storage controller inserts the protection information into the read data. As discussed above, the protection information can include, among other fields and or elements, an application tag, a cyclic redundancy check (CRC), and a reference tag. The protection information can be inserted within the drive channel by, for example, the I/O chip. As discussed, current I/O chips are configured to insert protection information, e.g., the reference tag field into each logical block. As discussed above, because the reference tag field increments by one, the I/O requests must be generated and/or otherwise issued for each stripe segment as the logical blocks of the stripe segments are not contiguous between stripe segments on each drive. In some embodiments, prior to inserting the sequential protection information, the storage controller first ensures and/or otherwise determines that a protection information insertion mode is enabled.

In parity generation stage, at step 924, the storage controller processes the stripe segments to generate the parity segments.

In a write generation stage, at step 926, the storage controller generates multiple write requests to each drive (or disk) of the RAID-based system. For example, in some embodiments the storage controller generates a write request for each stripe segment on each drive of the chunk of data including the parity the segments.

In a write sorting stage, at step 928, the storage controller sorts the writes according to a pre-determined arrangement. The pre-determined arrangement may be the same arrangement used for read requests. The pre-determined arrangement may be defined to sort the write requests sequentially on a per drive basis in order to, for example, reduce the drive head movement of those writes on the particular disk of a disk array.

In a write initiation stage, at step 930, the storage controller initiates and/or otherwise issues the write requests in parallel to enforce the pre-determined arrangement. Like the read requests, in one embodiment, the write requests may be initiated and/or otherwise issued to one or more transmit queue(s) in parallel. In this case, the transmit queue(s) enforce the order or arrangement of the requests to each drive of the RAID-based system.

Lastly, in a verification stage, at step 932, the storage controller checks the parity information prior to sending the write request to the storage subsystem.

The processes described herein are organized as sequences of operations in the flowcharts. However, it should be understood that at least some of the operations associated with these processes potentially can be reordered, supplemented, or substituted for, while still performing the same overall technique.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; solid-state memory device including flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A computing device comprising:
a memory containing machine readable medium comprising machine executable code having stored thereon instructions for performing a method of background initialization on storage volumes of a storage array, the storage array including a plurality of storage drives; and
a processor coupled to the memory, the processor configured to execute the machine executable code to cause the processor to:
generate a plurality of read requests to stripe segments of each storage drive of the plurality of storage drives, wherein each storage drive includes a plurality of stripe segments, each of the stripe segments having a plurality of logical blocks that are contiguous within a given one of the stripe segments and non-contiguous from stripe segment to stripe segment;
sort the plurality of read requests for each of the plurality storage drives sequentially on a per-drive basis;
initiate the plurality of read requests to each of the plurality storage drives in parallel and sequentially within each storage drive; and
insert sequential protection information corresponding to the plurality of logical blocks after initiating the plurality of read requests.

2. The computing device of claim 1, further comprising:
a storage subsystem including the storage array configured to receive and respond to multiple input/output (I/O) requests.

3. The computing device of claim 1, wherein the plurality of storage drives comprise disk drives, and the storage array comprises a RAID-based disk array.

4. The computing device of claim 1, wherein the plurality of storage drives comprise solid-state drives.

5. The computing device of claim 1, further comprising an I/O controller configured to:
receive a plurality of responses to the plurality of read requests; and
insert, inside a drive channel, the sequential protection information into each response for the corresponding logical blocks responsive to receiving the plurality of responses.

6. The computing device of claim 1, wherein, the processor is further configured to execute the machine executable code to cause the processor to perform the following actions prior to generating the plurality of read requests:
identify a portion of data on the storage array, wherein the plurality of read requests are generated for the portion of data,
wherein initiating the plurality of read requests in parallel comprises adding the plurality of read requests to a transmit queue in parallel, and
wherein the transmit queue is further configured to enforce an order in which the plurality of read requests are added and disallow intervening host I/O operations.

7. The computing device of claim 1, wherein the processor is further configured to execute the machine executable code to cause the processor to:

generate one or more parity segments for each of the plurality of storage drives;
generate a plurality of write requests to stripe segments of the plurality of storage drives of the storage array, wherein the plurality of write requests include write requests with the one or more parity segments;
sort the plurality of write requests for each of the plurality of storage drives sequentially on a per-drive basis; and
initiate the plurality of write requests in parallel to the plurality of storage drives.

8. The computing device of claim 1, wherein the I/O controller is further configured to:
receive the plurality of write requests from an initialization engine;
parse the plurality of write requests to identify the sequential protection information inserted into corresponding logical blocks; and
verify the sequential protection information is correct.

9. A non-transitory machine readable medium having stored thereon instructions for performing a method comprising machine executable code which when executed by at least one machine, causes the machine to:
generate multiple read requests for stripe segments of each drive of multiple drives of a storage array, wherein each drive includes multiple stripe segments having multiple logical blocks that are contiguous within the multiple stripe segments and non-contiguous from stripe segment to stripe segment;
sort the read requests for each of the drives sequentially on a per-drive basis;
initiate the read requests in parallel to the drives and sequentially within each one of the drives;
insert sequential protection information into corresponding logical blocks of each response inside a drive channel responsive to receiving responses to the multiple read requests; and
after the sequential protection information is inserted, generate and send a write request to each stripe segment and each parity segment of a chunk of data sequentially on the per-drive basis and in parallel for each of the storage drives.

10. The non-transitory machine readable medium claim 9, further comprising machine executable code which when executed by the at least one machine, causes the at least one machine to:
processes the stripe segments of the chunk of data to generate parities associated with each parity segment, wherein the write request to each parity segment includes an associated parity.

11. A method comprising:
generating, by a storage controller, a plurality of read requests for stripe segments of each drive of a plurality of drives of a storage array, wherein each drive includes a plurality of stripe segments having multiple logical blocks that are contiguous within the stripe segments and non-contiguous between the stripe segments;
sorting the plurality of read requests for each drive of the plurality of drives sequentially on a per-drive basis; and
initiating the plurality of read requests to the plurality of drives in parallel and sequentially within each drive.

12. The method of claim 11, wherein the plurality of drives comprise disk drives, and the storage array comprises a RAID-based disk array.

13. The method of claim 11, wherein the plurality of drives comprise solid-state drives.

14. The method of claim 11, further comprising:
receiving, by the storage controller, multiple responses to the plurality of read requests;
determining that a protection information insertion mode is enabled; and
inserting, by the storage controller, sequential protection information into the corresponding logical blocks of each response within a drive channel in response to determining that the protection information insertion mode is enabled.

15. The method of claim 14, wherein the protection information includes two or more of: an application tag, a cyclic redundancy check (CRC), or a reference tag.

16. The method of claim 11, further comprising:
prior to generating the plurality of read requests, identifying, by the storage controller, a portion of data in the storage array,
wherein the plurality of read requests are generated for each stripe segment in the portion of data.

17. The method of claim 16, wherein initiating the plurality of read requests comprises:
adding the plurality of read requests to a transmit queue in parallel,
wherein the transmit queue enforces the order in which the plurality of read requests are added and disallows intervening host input/output (I/O) operations.

18. The method of claim 16, further comprising:
processing each stripe segment in the portion of data to generate a parity associated with each of multiple parity segments in the portion of data.

19. The method of claim 18, further comprising:
generating, by the storage controller, a plurality of write requests to the stripe segments and the parity segments in the portion of data, wherein the plurality of write requests to each parity segment include the associated parity;
sorting the plurality of write requests for each of the plurality of drives sequentially on a per-drive basis; and
initiating the write requests in parallel to the plurality of drives and sequentially within each drive.

20. The method of claim 11, further comprising:
receiving, at the storage controller, an indication to perform a background initialization procedure on a RAID-based system;
wherein the storage controller generates the plurality of read requests responsive to receiving the indication.

* * * * *